United States Patent [19]
Chandronnait

[11] 3,711,953
[45] Jan. 23, 1973

[54] AXONOMETRIC DRAWING AID

[76] Inventor: Alfred J. Chandronnait, 19 Winnhaven Drive, Hudson, N.H. 03051

[22] Filed: June 15, 1970

[21] Appl. No.: 46,018

[52] U.S. Cl. ................................................33/77
[51] Int. Cl. ..............................................B43l 13/14
[58] Field of Search ............235/70; 35/26; 33/77, 75

[56] References Cited

UNITED STATES PATENTS

| | | | |
|---|---|---|---|
| 1,751,885 | 3/1930 | Riehle | 235/85 R |
| 2,832,252 | 4/1958 | Gabriel | 235/70 R |
| 2,734,274 | 2/1956 | Sams | 33/77 |

FOREIGN PATENTS OR APPLICATIONS

| | | | |
|---|---|---|---|
| 1,008,492 | 5/1957 | Germany | 33/77 |
| 591,691 | 8/1947 | Great Britain | 33/77 |

*Primary Examiner*—Harry N. Haroian
*Attorney*—Robert T. Dunn

[57] ABSTRACT

A slide rule aid or calculator for making axonometric drawings includes a scale with a slide having apertures or windows each of which aligns with a different row of numbers on the scale. The rows identify the angles of axis lines in the drawing, the relative lengths of the edges of a unit cube in the drawing and the ellipse templates to be used for drawing circles in the drawing. At each position of the slide along the scale, a different set of axis line angles, relative lengths of edges of a unit cube and ellipse templates are revealed in the apertures. The calculator may be used in conjunction with and may be part of a straight edge equipped with pivoting arms and a vertical arm to which scales selected from a bank of scales are removably attached and which are used for measuring distances along the axis line angles in the drawing. This provides a combined calculator and drawing instrument.

9 Claims, 8 Drawing Figures

INVENTOR.
ALFRED J. CHANDRONNAIT
BY Robert T. Dunn
ATTORNEY

FIG. 4

| | |
|---|---|
| ROW 7 | 10 10 10 10 10 10 10 10 10 15 15 15 15 15 15 15 15 15 20 20 20 20 20 20 20 20 25 25 25 25 25 25 25 30 30 30 30 30 30 30 35 35 35 35 35 35 40 40 40 40 40 45 45 45 50 50 50 |
| ROW 8 | 15 20 25 30 35 40 45 50 55 10 15 20 25 30 35 40 45 50 10 15 20 25 30 35 40 45 10 15 20 25 30 35 40 10 15 20 25 30 35 40 10 15 20 25 30 35 10 15 20 25 30 10 15 20 5 10 15 |
| ROW 9 | 15 15 15 20 20 25 25 25 30 15 15 20 20 25 25 30 35 35 15 20 20 25 25 30 35 35 15 20 25 30 30 35 40 20 25 25 30 35 40 45 20 25 30 35 40 45 25 30 35 40 45 25 35 35 20 25 35 |
| ROW 12 | 1 1 $\frac{31}{32}$ $\frac{31}{32}$ $\frac{15}{16}$ $\frac{15}{16}$ $\frac{29}{32}$ $\frac{7}{8}$ $\frac{7}{8}$ 1 1 $\frac{31}{32}$ $\frac{31}{32}$ $\frac{31}{32}$ $\frac{15}{16}$ $\frac{29}{32}$ $\frac{29}{32}$ $\frac{27}{32}$ 1 $\frac{31}{32}$ $\frac{15}{16}$ $\frac{15}{16}$ $\frac{7}{8}$ $\frac{7}{8}$ $\frac{7}{8}$ $\frac{27}{32}$ $\frac{31}{32}$ $\frac{31}{32}$ $\frac{15}{16}$ $\frac{29}{32}$ $\frac{7}{8}$ $\frac{13}{16}$ $\frac{27}{32}$ $\frac{31}{32}$ $\frac{31}{32}$ $\frac{7}{8}$ $\frac{7}{8}$ $\frac{13}{16}$ $\frac{25}{32}$ $\frac{23}{32}$ $\frac{15}{16}$ $\frac{15}{16}$ $\frac{7}{8}$ $\frac{13}{16}$ $\frac{25}{32}$ $\frac{3}{4}$ $\frac{15}{16}$ $\frac{29}{32}$ $\frac{7}{8}$ $\frac{27}{32}$ $\frac{23}{32}$ $\frac{29}{32}$ $\frac{29}{32}$ $\frac{27}{32}$ $\frac{31}{32}$ $\frac{7}{8}$ $\frac{27}{32}$ |
| ROW 10 | 50 55 55 55 55 55 55 55 55 40 45 50 50 50 50 50 50 50 35 40 40 45 45 45 45 45 30 35 40 40 40 40 40 30 35 30 35 35 35 35 25 30 30 30 30 30 25 25 30 30 25 20 25 25 15 15 20 |
| ROW 11 | 40 35 30 30 25 25 20 15 15 50 45 40 35 35 30 25 25 20 55 50 40 40 30 30 30 25 55 50 45 40 35 30 30 55 50 45 40 35 30 25 55 50 45 40 35 30 55 50 45 40 35 55 50 45 60 55 50 |
| ROW 13 | $\frac{13}{16}$ $\frac{7}{8}$ $\frac{7}{8}$ $\frac{29}{32}$ $\frac{29}{32}$ $\frac{15}{16}$ $\frac{15}{16}$ $\frac{15}{16}$ $\frac{31}{32}$ $\frac{11}{16}$ $\frac{23}{32}$ $\frac{27}{32}$ $\frac{27}{32}$ $\frac{7}{8}$ $\frac{29}{32}$ $\frac{29}{32}$ $\frac{15}{16}$ $\frac{15}{16}$ $\frac{21}{32}$ $\frac{3}{4}$ $\frac{3}{4}$ $\frac{27}{32}$ $\frac{27}{32}$ $\frac{7}{8}$ $\frac{29}{32}$ $\frac{15}{16}$ $\frac{19}{32}$ $\frac{11}{16}$ $\frac{25}{32}$ $\frac{13}{16}$ $\frac{27}{32}$ $\frac{7}{8}$ $\frac{29}{32}$ $\frac{5}{8}$ $\frac{23}{32}$ $\frac{11}{16}$ $\frac{25}{32}$ $\frac{27}{32}$ $\frac{7}{8}$ $\frac{29}{32}$ $\frac{19}{32}$ $\frac{11}{16}$ $\frac{23}{32}$ $\frac{25}{32}$ $\frac{13}{16}$ $\frac{7}{8}$ $\frac{5}{8}$ $\frac{21}{32}$ $\frac{25}{32}$ $\frac{13}{16}$ $\frac{27}{32}$ $\frac{19}{32}$ $\frac{23}{32}$ $\frac{25}{32}$ $\frac{15}{32}$ $\frac{1}{2}$ $\frac{11}{16}$ |
| ROW 14 | $\frac{11}{16}$ $\frac{21}{32}$ $\frac{19}{32}$ $\frac{5}{8}$ $\frac{19}{32}$ $\frac{5}{8}$ $\frac{19}{32}$ $\frac{1}{2}$ $\frac{9}{16}$ $\frac{13}{16}$ $\frac{23}{32}$ $\frac{3}{4}$ $\frac{11}{16}$ $\frac{23}{32}$ $\frac{11}{16}$ $\frac{21}{32}$ $\frac{23}{32}$ $\frac{11}{16}$ $\frac{7}{8}$ $\frac{27}{32}$ $\frac{3}{4}$ $\frac{25}{32}$ $\frac{11}{16}$ $\frac{23}{32}$ $\frac{25}{32}$ $\frac{25}{32}$ $\frac{7}{8}$ $\frac{27}{32}$ $\frac{27}{32}$ $\frac{13}{16}$ $\frac{25}{32}$ $\frac{25}{32}$ $\frac{13}{16}$ $\frac{29}{32}$ $\frac{7}{8}$ $\frac{27}{32}$ $\frac{27}{32}$ $\frac{27}{32}$ $\frac{13}{16}$ $\frac{27}{32}$ $\frac{29}{32}$ $\frac{29}{32}$ $\frac{7}{8}$ $\frac{7}{8}$ $\frac{7}{8}$ $\frac{7}{8}$ $\frac{15}{16}$ $\frac{29}{32}$ $\frac{29}{32}$ $\frac{29}{32}$ $\frac{29}{32}$ $\frac{15}{16}$ $\frac{15}{16}$ $\frac{15}{16}$ $\frac{31}{32}$ $\frac{15}{16}$ $\frac{15}{16}$ |

FIG. 4

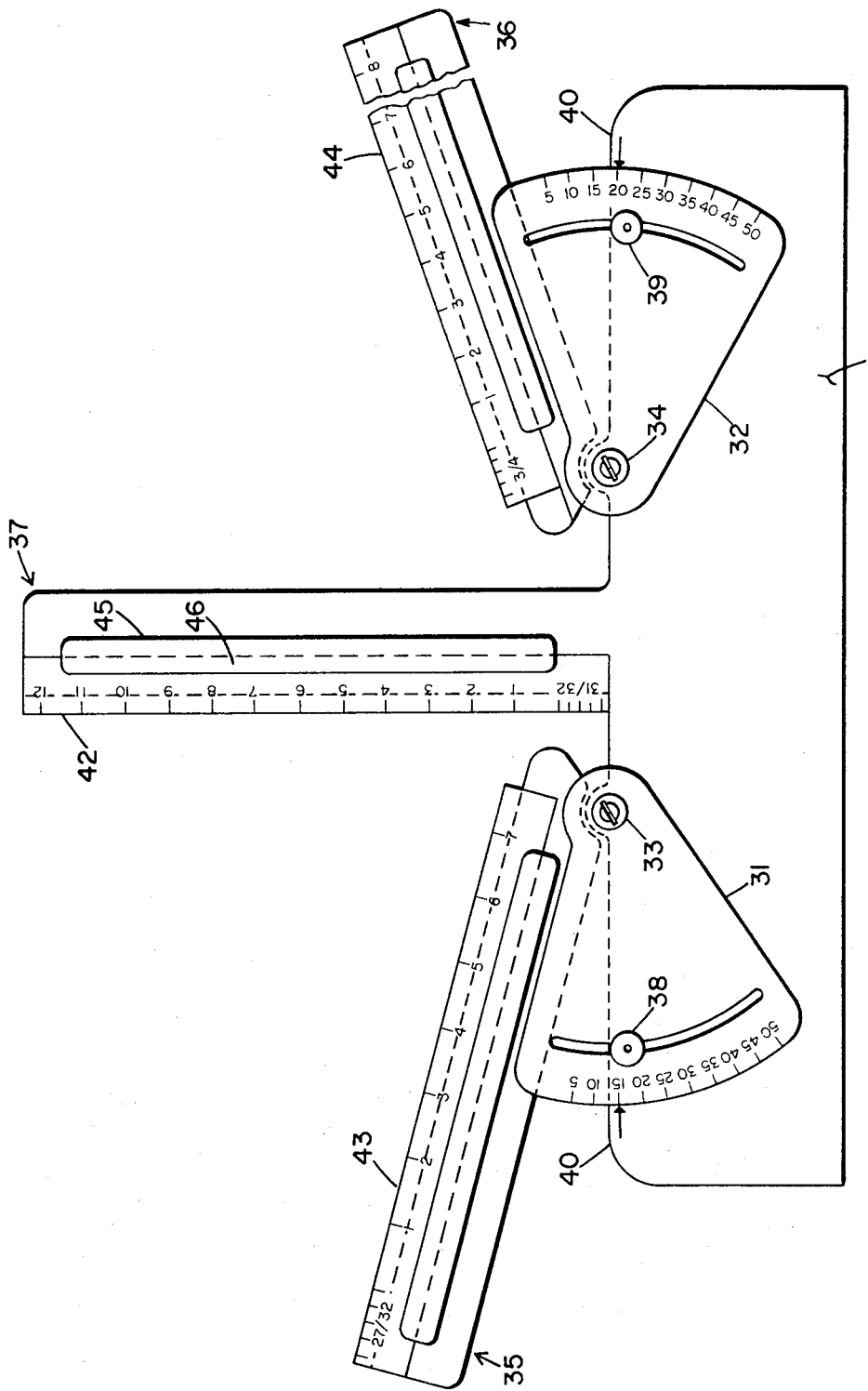

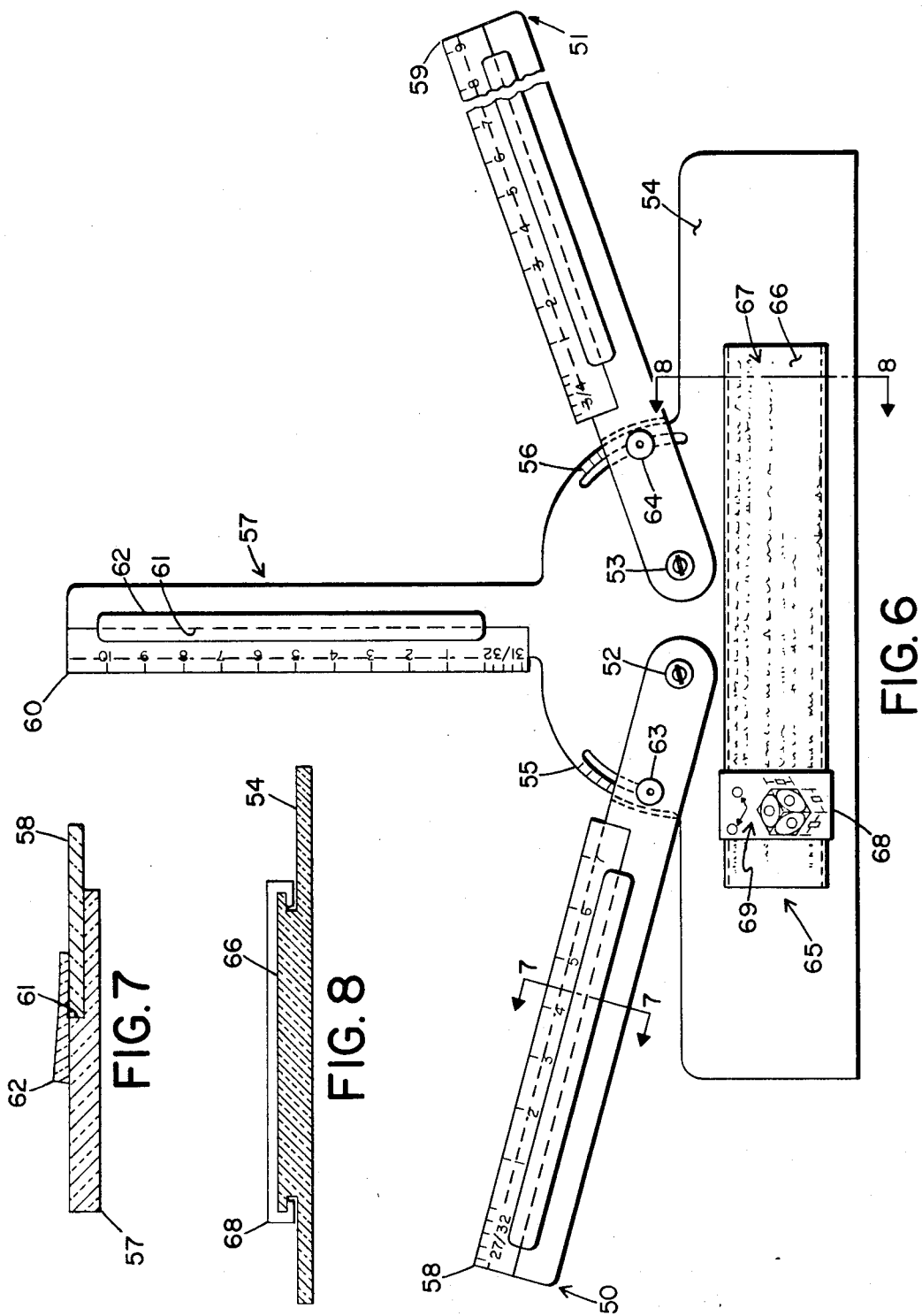

AXONOMETRIC DRAWING AID

This invention relates to drawing aids and more particularly to a slide rule type calculator device which aids making axonometric drawings.

Axonometric drawings are similar to perspective drawings insofar as they represent solid objects on a plain surface as they would appear to an observers eye when viewed from a given point. In both perspective and axonometric drawings, dimensions along orthogonal axis lines are foreshortened relative to actual dimensions of the real subject. Unlike perspective drawings parallel lines of the real subject are also parallel in the axonometric drawing. In perspective drawings, the parallel lines radiate from a vanishing point. Three types of axonometric drawings are in common use: isometric, dimetric and trimetric. In isometric, the three axes represent directions inclined at the same angle to the plane of the drawing and so they need not be foreshortened or they are foreshortened equally. In dimetric only two axes are inclined at the same angle and in trimetric the three axes are inclined at different angles.

Heretofore, axonometric drawings have been made by setting left and right axis line angles and determining from these angles the dimensions along or parallel to these lines of parts of a subject. The dimensions are always shorter than the actual scale dimensions of the subject and must be calculated by the draftsman as a function of the angles and then laid out with a scale ruler. Circles lying in the planes defined by the axis lines are usually drawn with an ellipse master. The ellipse master contains templates representing circles of different diameters lying in the planes. Charts are used by draftsmen to find the proper ellipse template in terms of the angles and dimensions. Consequently, a draftsman making a precise trimetric drawing must make numerous calculations to lay out dimensions and refer to a chart for guidance in using the ellipse master.

It is an object of the present invention to provide an aid for making drawings representative of a three dimensional view.

It is another object to provide apparatus which facilitates making scaled three dimensional drawings on a plane.

It is another object to provide a calculation instrument by which to determine scales and ellipses in orthogonal plains represented in a three dimensional drawing.

It is another object to provide drafting apparatus for computing and measuring scales and angles and for determining ellipse patterns in axonometric drawings.

The above objects and others will appear from the following detailed description of the best known uses of the present invention. In one useful embodiment of the invention described herein, a slide rule type calculator is provided including a slide with apertures or windows. The slide is moveable along a track over different lines of numbers identifying parameters. The parameters are the angles of axis lines in an axonometric drawing, the relative lengths of the edges of a unit cube in the drawing (the scales in orthogonal directions) and the ellipse templates to be used for drawing circles in the drawing. At any position of the slide, a given set of numbers appears in the windows identifying these parameters and the set is used by a draftsman to make the drawing. In another embodiment, the track is on a straight edge having angle scales at the center with two arms pivoted at the origins of the angle scales and a third rigid arm perpendicular to the straight edge. Removable scales which are attached to the three arms are selected from a bank of scales as identified by the parameters (relative lengths of the edges of a unit cube) appearing in the apertures of the slide for the selected setting of the slide.

The above objects and features and others will be apparent in view of the following specific description of the best known uses of the invention taken in conjunction with the figures in which:

FIG. 4 is a table showing the numbers (parameter values) in rows along the face of the calculator;

FIG. 5 is a plan view of a drawing instrument used in conjunction with the calculator;

FIG. 6 is a plan view of a combination calculator and drawing instrument;

FIGS. 7 and 8 are cross section edge views of the combination calculator drawing instrument taken as shown in FIG. 6.

Figure 1:
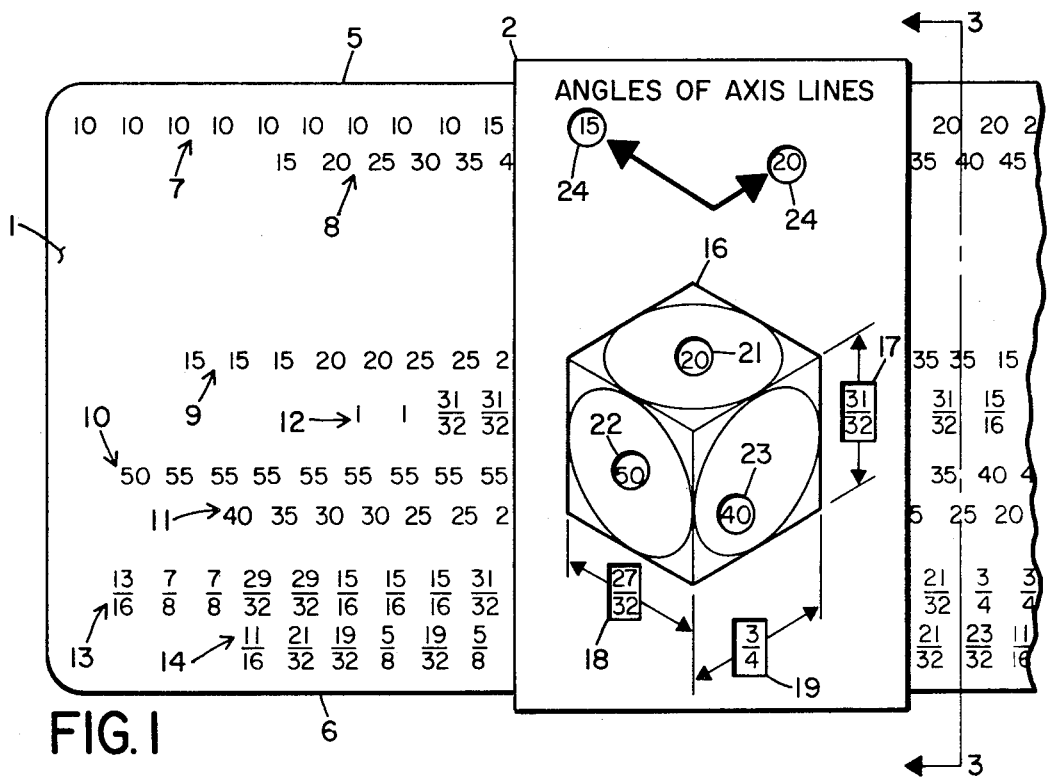
FIG. 1 is a plan view of the slide rule type calculator aid including a movable slide, for determining parameters for making three dimensional or axonometric drawings.
Figure 2:
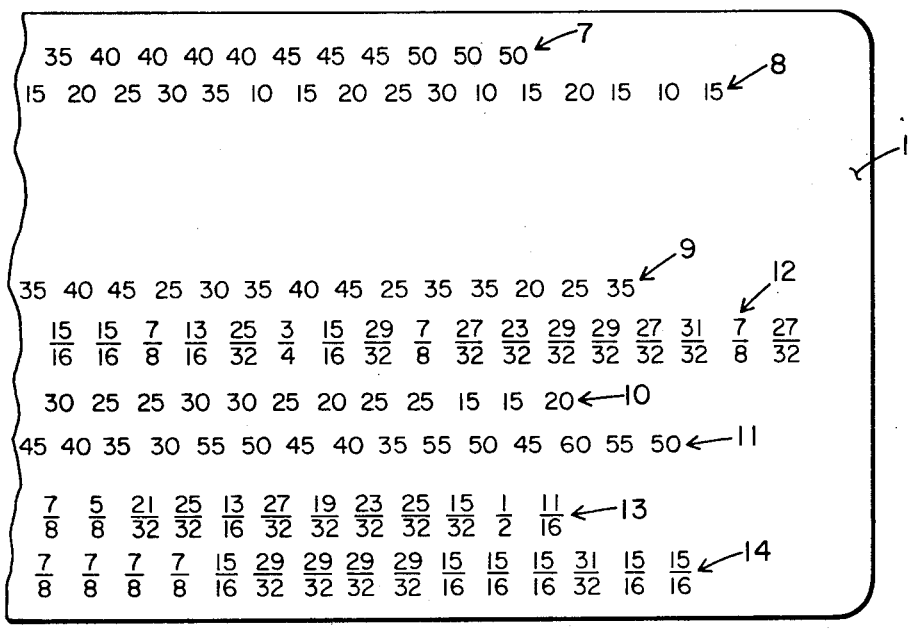
FIG. 2 is a plan view of the other end of the calculator.
Figure 3:
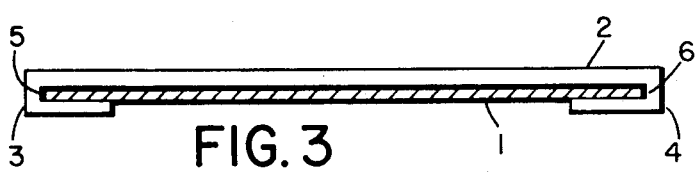
FIG. 3 is an end view of the calculator.

The calculator shown in FIGS. 1 to 3 includes a base member 1 and a slide 2 adapted to slide along the base member from one end to the other. For this purpose, the edges of the slide 3 and 4 may define channels which engage the edges 5 and 6 of the base member and so in effect the edges of the base member provide a track along which the slide is movable. On the face of the base member are eight rows of numbers. Rows 7 and 8 contain the numbers which represent the angles of left and right axis lines, respectively. Rows 9, 10 and 11 contain numbers which identify the patterns in an ellipse master which are used to draw circular objects in the axonometric drawing lying in three perpendicular planes represented in the drawing. Rows 12, 13 and 14 contain numbers which represent the relative lengths of the edges of a unit cube having faces lying in the three principal planes represented in the drawing. The numbers representing relative lengths of the edges of a unit cube are ratios of the scale used for all dimension parallel to an edge of the unit cube relative to the scale of the drawing. The numbers along each row are uniformally spaced and appear in boxes of equal size and all boxes in all rows are the same size. The sequence of numbers in each row are set forth in the table in FIG. 4.

The face of the slide 2 contains an image 16 of a unit cube drawn in the isometric and represents all axonometric views. The relative dimensions for each of the edges of the unit cube appear through square apertures 17, 18 and 19 at these dimensions. These relative dimensions are numbers visible from rows 12, 13 and 14, respectively. In the three faces of the unit cube 16 are three circular apertures 21, 22 and 23 through which numbers from rows 9, 10 and 11 identifying ellipse templates are visible. In circular apertures 24 and 2 , numbers representing the left and right axis lines from rows 7 and 8, respectively, are visible. Thus, the apertures in the slide 2 reveal a set of parameter numbers, one from each of the rows 7 to 14, and these numbers are used by a draftsman as a guide in making an axonometric drawing to scale. The numbers in apertures 24 and 25 are the angles of the left and right axis lines which are parallel to the edges of the unit cube. The numbers in apertures 17 to 19 are ratios of the scales along the three orthogonal edges of the unit cube to the scale of the drawing. These ratios are expressed as fractions which do not exceed one and reveal to the draftsman the scale to be used in drawing lines parallel to the edges of the cube to make the drawing to scale. The numbers in circular apertures 21 to 23 identify the ellipse templates selected from an ellipse master to be used for drawing ellipses that represent circles portrayed by the drawing. The circles portrayed lie in planes parallel to the three orthogonal faces of the unit cube.

As the slide 2 is moved along the base member 1, a different set of numbers appears in the apertures 17 to 19 and 21 to 23 for each different set of angles of left and right axis lines appearing in the apertures 24 and 25. For example, as shown in FIG. 1, when the left and right angles are 15° and 20°, respectively, the vertical, left and right relative lengths of the unit cube are 31/32, 27/32 and 3/4, respectively. These ratios define scales which the draftsman selects from a bank of scales to be used when laying out distances in the drawing parallel to the identified edges of the unit cube. The numbers 20, 50 and 40 appearing in the circular apertures 21, 22 and 23, respectively, identify the angular designations of the ellipse templates on an ellipse master. Using these angular designations, the draftsman selects from the ellipse master an ellipse of the same angular designation and of dimension indicated on the master and draws the ellipse. The ellipse so drawn represents in the axonometric drawing a circle lying in a plane parallel to the identified plane of the unit cube.

A drawing instrument used in conjunction with the calculator is shown by FIG. 5. The drawing instrument includes a straight edge 30 with left and right angle scales 31 and 32 pivotally attached to the straight edge at pivots 33 and 34, respectively. Left and right scale holders 35 and 36 are fixedly attached along the edges of angle scales 31 and 32, respectively. A third scale holder 37 extends perpendicular to the straight edge between the angle scales. The angle scales are pivoted on the pivots to adjust the angles of the scale holders and thumb nuts 38 and 39 are tightened to fix the angular positions of the scales at the axis line angles designated by the calculator. When not in use, the left and right holders may be rotated to lie flush with the edge 40 of the straight edge and locked in that position by tightening the thumb nuts.

The drawing instrument is used in conjunction with the calculator by setting the scales 31 and 32 at the left and right axis lines angles appearing in apertures 24 and 25 of the calculator slide. The unit cube dimension ratios appearing in apertures 17 to 19 of the calculator slide identify the scales which are chosen from a bank of scales by the draftsman and mounted on the three scale holders 35 to 37. For example, if the calculator reads as shown in FIG. 1, then scale 35 is set at 15°, scale 36 is set at 20°, a scale 42 of ratio 31/32 is mounted to holder 37, a scale 43 of ratio 27/32 is mounted to holder 35 and a scale 44 of ratio 3/4 is mounted to holder 36. Each holder has a tab such as 45 extending over a step such as 46 which define a slot into which the selected scale is inserted and held by friction. At this point, the draftsman uses the instrument to lay out lines in the drawing that represent the object and uses the scales mounted to the arms directly to lay out dimensions measured directly from the object being drawn. Circular parts of the object lying in planes parallel to the faces of the unit cube are represented by ellipses selected from the ellipse master as already described. The bank of scales may include a number of scales for each ratio, the scales of the same ratio being marked off differently depending upon what scale the drawing bears to the true object. For example, the scales of ratio 31/32 may be full scale, half-scale, quarter-scale, etc. and so, if the draftsman is making a drawing one-half the size of the object, he will select various ratios as dictated by the calculator from the one-half size scales.

FIGS. 6 to 8 depict a combination calculator and drawing instrument. This combination device incorporates features of both of the calculator shown in FIGS. 1 to 3 and the drawing instrument shown in FIG. 5. In the combination device, the left and right scale holders 50 and 51 are pivotally mounted on axles 52 and 53 at the middle of the straight edge 54 at the centers of an angle scales 54 and 56 which extends from the middle of the straight edge. A rigid scale holder 57 extends from the angle scales perpendicular to the straight edge. Selected scales 58 to 60 are attached to the holders 50, 51 and 57, respectively, as shown in FIG. 7. Each holder such as 57 has a step 61 and fixed tab 62 defining a groove into which the scale slides and is held by the slight spring action of the tab.

The pivoted scale holders 50 and 51 are preferably contoured to fit over the angle scales 55 and 56 so that they lie flush with the straight edge on a drawing surface. Thumb nuts 63 and 64 are tightened to fix the holders 50 and 51 at the angular positions desired.

The calculator 65 is an integral part of the straight edge 54. A pedestal 66 along the straight edge defines the base or face of the calculator. The eight rows of numbers 67 are located along this pedestal. A slide 68 slideably attaches to the pedestal and is used to select the combinations of parameters which aid in making an axonometric drawing. Apertures 69 are located in the slide just as the apertures are located in slide 2 shown in FIG. 1 and the rows of numbers along the pedestal are the same as rows 7 to 14 shown in FIG. 1.

The combination device is used in conjunction with an ellipse master template and bank of scales just as already described above with respect to the calculator and the drawing instrument not physically connected. Convenience is gained by combining the calculator and drawing instrument in a single unitary device.

These embodiments reveal the best known uses of the invention and the best known combined uses of the calculator and drawing instrument.

What is claimed is:

1. An aid for making a three dimensional drawing comprising,
 a base member,
 a slide member having apertures and equipped to slide along the base member, a three dimensional view of a geometric figure on the slide member representing the perspective of the drawing and having the common geometric axes thereof identified on the slide, a first set of numbers on the base member which align with a first group of the apertures for identifying the angles of the axis lines in the drawing, a second group of said apertures located on the slide at the positions of dimensions of the geometric figure on the slide, and a second set of numbers on the base member which align with the second group of apertures for identifying the relative scales along the axis lines in the drawing.

2. An aid as in claim 1 and in which,
the sets of numbers are formed by rows of the numbers running parallel to the direction of slide of the slide member.

3. An aid as in claim 2 and in which,
each aperture in the slide member aligns with numbers in only one row.

4. An aid as in claim 1 and in which, the figure on the slide is
a three dimensional view of a unit cube, and
the apertures for relative scales are located on the slide at the positions of dimensions of the cube on the slide.

5. An aid as in claim 4 and including,
a third set of numbers on the base member which align with a third group of apertures for identifying the ellipse templates to be used for drawing circles represented in the drawing
the apertures for the ellipse templates being located in the faces of the cube figure on the slide.

6. An aid as in claim 5 and in which,
there are apertures for the angles of left and right axis lines,
there are three apertures for relative scales of dimensions parallel to three orthogonal axis lines in the drawing, and
there are three apertures for the ellipse template numbers.

7. An aid as in claim 5 and in which,
there are apertures for the angles of left and right axis lines,
there are three apertures for the relative scales which are the relative lengths of the vertical edge, the left horizontal edge and the right horizontal edge of a unit cube in the drawing, and
there are three apertures for the ellipse template numbers.

8. An aid as in claim 5 and in which,
there are three apertures for relative lengths of the edges of the unit cube which are a vertical edge, a left horizontal edge and a right horizontal edge, and
there are three apertures for the ellipse template numbers.

9. A drawing aid as in Claim 1 and further including,
a straight edge member which is an integral part of the base member,
two arms pivotally attached to the straight edge
at least one angle scale on the straight edge for measuring the pivot angles of the arms,
the arms being adapted for attachment of different linear scales thereto,
whereby the arms can be selectively set at axis line angles and suitable linear scales can be attached to the arms for measuring dimensions parallel to the axis lines in the drawing.

* * * * *